United States Patent
Kang

(10) Patent No.: US 9,582,087 B2
(45) Date of Patent: Feb. 28, 2017

(54) FLEXIBLE TOUCH SCREEN PANEL AND METHOD OF MANUFACTURING THE SAME

(71) Applicant: SAMSUNG DISPLAY CO., LTD., Yongin, Gyeonggi-do (KR)

(72) Inventor: Sung-Ku Kang, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 718 days.

(21) Appl. No.: 13/792,452

(22) Filed: Mar. 11, 2013

(65) Prior Publication Data

US 2014/0145977 A1  May 29, 2014

(30) Foreign Application Priority Data

Nov. 23, 2012  (KR) .......................... 10-2012-0133676

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 2203/04102* (2013.01); *G06F 2203/04103* (2013.01)

(58) Field of Classification Search
CPC .............................. G06F 1/652; H04M 1/0268
See application file for complete search history.

(56) References Cited

U.S. PATENT DOCUMENTS

| 6,307,751 | B1* | 10/2001 | Bodony | G06F 1/16 |
| | | | | 361/679.08 |
| 2002/0190961 | A1* | 12/2002 | Chen | G06F 3/044 |
| | | | | 345/173 |
| 2003/0166819 | A1* | 9/2003 | Dewanjee | A63B 37/0003 |
| | | | | 528/44 |
| 2003/0224582 | A1 | 12/2003 | Shimoda et al. | |

(Continued)

FOREIGN PATENT DOCUMENTS

| KR | 1020040097228 A | 11/2004 |
| KR | 10-2005-0067182 A | 6/2005 |

(Continued)

*Primary Examiner* — Patrick Edouard
*Assistant Examiner* — Matthew Yeung
(74) *Attorney, Agent, or Firm* — Robert E. Bushnell, Esq.

(57) ABSTRACT

There is provided a flexible touch screen panel capable of being bent or folded. The flexible touch screen panel includes a film substrate and sensing electrodes formed in an active area of at least one surface of the film substrate. The film substrate is divided into a plurality regions so that elongation ratios differ between regions of the film substrate. Also provided is a method of manufacturing a flexible touch screen panel including providing a supporting substrate including a plurality of distinct regions, coating a plurality of film materials onto the supporting substrate, the distinct regions of the supporting substrate being coated with different film materials, hardening the film materials to form a film substrate, forming touch sensing patterns including sensing electrodes on the film substrate, and separating the supporting substrate and the film substrate from each other.

5 Claims, 7 Drawing Sheets

(56) References Cited

U.S. PATENT DOCUMENTS

| | | | |
|---|---|---|---|
| 2004/0017364 A1* | 1/2004 | Tanaka | G02F 1/13338 345/173 |
| 2005/0259189 A1 | 11/2005 | Bouten et al. | |
| 2006/0274048 A1* | 12/2006 | Spath | G06F 3/045 345/173 |
| 2006/0292295 A1* | 12/2006 | Kwon | C11D 11/0047 427/162 |
| 2007/0085837 A1* | 4/2007 | Ricks | G02F 1/13338 345/173 |
| 2008/0062140 A1* | 3/2008 | Hotelling | G02F 1/13338 345/173 |
| 2008/0079656 A1* | 4/2008 | Kee | G06F 1/1641 345/1.3 |
| 2009/0226841 A1* | 9/2009 | Kamitani | B41C 1/1008 430/270.1 |
| 2010/0134436 A1 | 6/2010 | Jeong et al. | |
| 2010/0164888 A1* | 7/2010 | Okumura | G06F 1/1626 345/173 |
| 2010/0182256 A1 | 7/2010 | Jeong et al. | |
| 2010/0182259 A1 | 7/2010 | Jung et al. | |
| 2010/0253651 A1* | 10/2010 | Day | G06F 3/044 345/175 |
| 2012/0075207 A1 | 3/2012 | Jang | |
| 2012/0105344 A1* | 5/2012 | Ko | G06F 3/044 345/173 |
| 2012/0162099 A1* | 6/2012 | Yoo | G06F 3/0412 345/173 |
| 2012/0192466 A1* | 8/2012 | Kee | H04M 1/0266 40/1 |
| 2012/0329528 A1* | 12/2012 | Song | H04M 1/0268 455/566 |

FOREIGN PATENT DOCUMENTS

| | | |
|---|---|---|
| KR | 1020070079820 A | 8/2007 |
| KR | 10-1022087 B1 | 3/2011 |
| KR | 10-1022105 B1 | 3/2011 |
| KR | 10-1073285 B1 | 10/2011 |
| KR | 10-2012-0032735 A | 4/2012 |

* cited by examiner

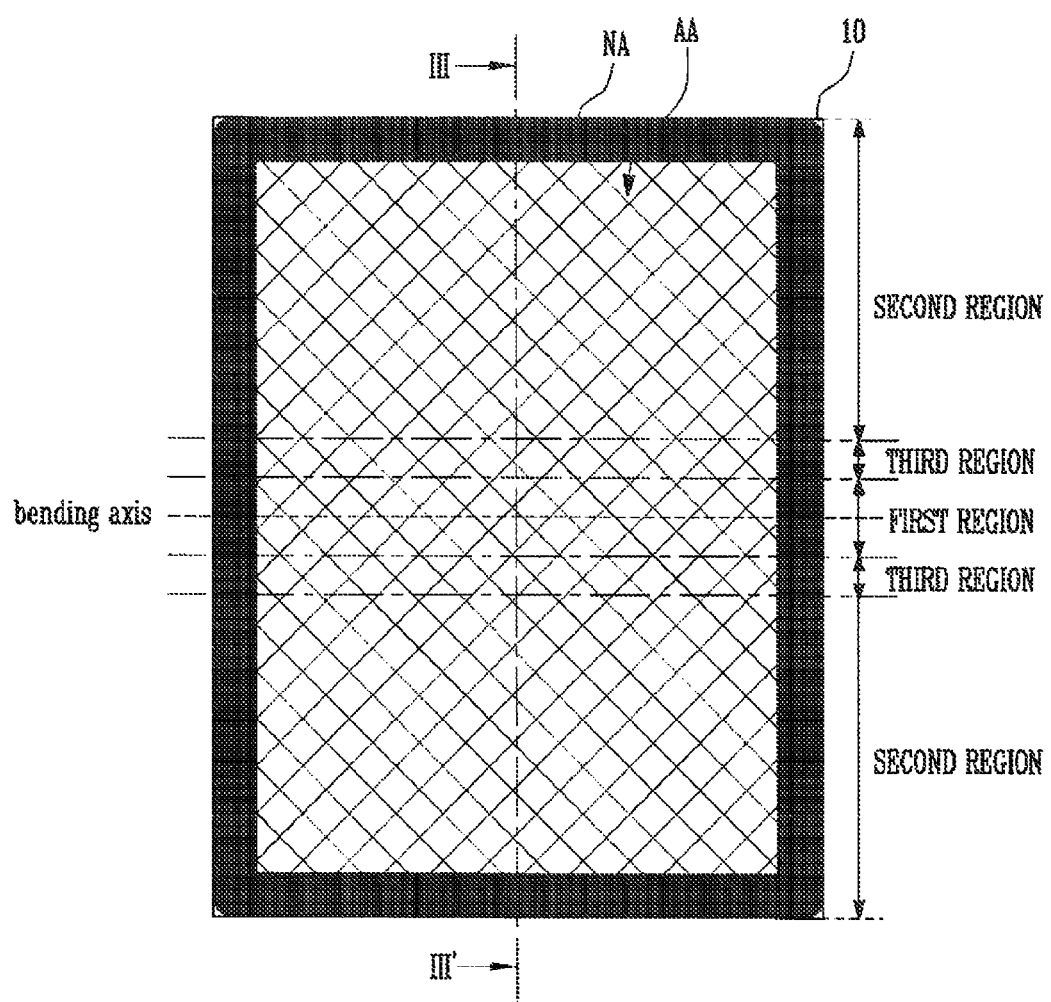

FLEXIBLE TOUCH SCREEN PANEL AND METHOD OF MANUFACTURING THE SAME

CLAIM OF PRIORITY

This application makes reference to, incorporates the same herein, and claims all benefits accruing under 35 U.S.C. §119 from an application earlier filed in the Korean Intellectual Property Office filed on 23 Nov. 2012 and there duly assigned Serial No. 10-2012-0133676.

BACKGROUND OF THE INVENTION

Field of the Invention

The present invention relates to a flexible touch screen panel and a method of manufacturing the same, and, more particularly, to a flexible touch screen panel capable of being bent or folded and a method of manufacturing the same.

Description of the Related Art

A touch screen panel is an image display device that gives a user the ability to select from content displayed on the screen of the device using a human hand or an object to input the command of the user.

Accordingly, the touch screen panel is provided on the front face of the image display device to convert a contact position of the human hand or the object into an electrical signal. The content selected by the contact position is received as an input signal.

Since the touch screen panel may replace an additional input device that would otherwise be coupled to the image display device, such as a keyboard and a mouse, touch screens are gradually growing in popularity.

Methods of realizing a touch screen panel include a resistance layer method, a photo-sensing method, and an electro-capacitive method. Among the above methods, the widely used electro-capacitive touch screen panel senses a change in capacitance formed in a conductive sensing cell with another peripheral sensing cell or a ground electrode when the human hand or the object such as a stylus pen contacts the touch screen panel to convert the contact position into the electrical signal.

The electro-capacitive touch screen panel is commonly attached to the external surface of an image display device, such as one of a liquid crystal display (LCD) and an organic light emitting display (OLED). Therefore, the touch screen panel requires high transparency and a thin film characteristic.

In addition, recently, development of a flexible image display device having a flexible touch screen panel attached onto a flexible image display has been underway.

The conventional touch screen panel includes sensing cells formed on a glass substrate of a transparent conductive material such as indium tin oxide (ITO) and is not flexible.

In order to apply the conventional touch screen panel concept to the flexible image display device, a method of using a flexible thin film such as polyethylene terephthalate (PET) as the substrate of the touch screen panel is suggested. However, when the thin film is used as the substrate of the touch screen panel and the ultimate deformation ratio is small, the touch screen panel has limited flexibility in that it cannot be bended or folded and is therefore of limited use.

SUMMARY OF THE INVENTION

Accordingly, the present invention is presented to provide a flexible touch screen panel capable of being bent or folded and a method of manufacturing the same.

In order to achieve the foregoing and/or other aspects of the present invention, there is provided a flexible touch screen panel, including a film substrate and sensing electrodes formed in an active area of at least one surface of the film substrate. The film substrate is divided into a plurality regions, the regions differing in their elongation ratios.

The film substrate may include a first region provided in a predetermined central region and having an elongation ratio allowing the first region to be bent. Second regions may be provided on at least one side of the first region, the second regions having a smaller elongation ratio and greater hardness in comparison with the first region.

The film substrate may be formed to be bendable or foldable when a bending axis is positioned in the first region.

The first region may be formed of at least one selected from polydimethylsiloxane (PDMS) and polyurethane.

The second regions may be formed of at least one material selected from poly(methyl methacrylate) (PMMA), polyimide, and polyethersulfone.

The second regions may be provided on at least one side of the first region, that is, above and below the first region or on at least one side of the first region, that is, on the left and the right sides of the first region.

The film substrate may further include third regions provided between the first region and the second regions, the third regions having an elongation ratio between that of the first region and that of the second regions.

The third regions may be formed of a polymer film material, the hardness of the material being gradually increased from one side adjacent to the first region to other sides adjacent to the second regions.

Ductile opaque metal may be patterned to a mesh network to form the sensing electrodes.

The flexible touch screen panel may further include a functional coating layer provided over an entire surface opposite to the at least one surface of the film substrate on which sensing electrodes are formed.

There is provided a method of manufacturing a flexible touch screen panel, including providing a supporting substrate, a plurality of regions of the supporting substrate being distinguished from each other, coating a plurality of film materials onto the supporting substrate, the distinct regions of the supporting substrate being coated with different film materials, hardening the film materials to form a film substrate, forming touch sensing patterns including sensing electrodes on the film substrate, and separating the supporting substrate and the film substrate from each other. In forming the film substrate, regions of the supporting substrate are distinguished from each other, and the regions are coated with different film materials so that regions of the film substrate may be formed of different materials.

In forming the film substrate, the regions of the supporting substrate may be coated with different film materials using a multi slit coater.

In forming the film substrate, a predetermined central region in the flexible touch screen panel may be referred to as a first region and regions provided on at least one side of the first region may be referred to as second regions, the first region and the second regions may be coated with different film materials, and the second regions may be coated with a film material harder than the film material coated on the first region.

The first region may be coated with at least one selected from polydimethylsiloxane (PDMS) and polyurethane. The second regions may be coated with at least one film material selected from poly(methyl methacrylate) (PMMA), polyimide, and polyethersulfone.

In forming the film substrate, third regions may be further provided between the first region and the second regions, and the third regions may be coated with a polymer film material that is harder than the film material coated on the first region and softer than the film material coated on the second regions.

In forming the film substrate, the third regions may be further provided between the first region and the second regions so that a polymer film material is coated on the third regions and is hardened and that the film material coated on the third regions has hardness that gradually increases from the side adjacent to the first region to the sides adjacent to the second regions.

The third regions may be hardened by gradually increasing the concentration of a hardener included in the film material coated on the third regions from a low extreme adjacent to the first region to a high extreme adjacent to the second regions. Alternatively, the third regions may be hardened with ultraviolet (UV) light by gradually increasing the concentration of a photoinitiator in the film material from a low extreme adjacent to the first region to a high extreme adjacent to the second regions, with subsequent UV exposure.

The flexible touch screen panel according to the present invention includes a film substrate divided into a plurality of regions having different elongation ratios. Therefore, the hardness and elongation ratio may be optimized by region to satisfy various requirements of consumers, and, in particular, the flexible touch screen panel that may be bent or folded may be realized.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings, in which like reference symbols indicate the same or similar components, wherein:

FIG. 3 is a plan view illustrating a touch screen panel according to an embodiment of the present invention;

DETAILED DESCRIPTION OF THE INVENTION

Figure 1:
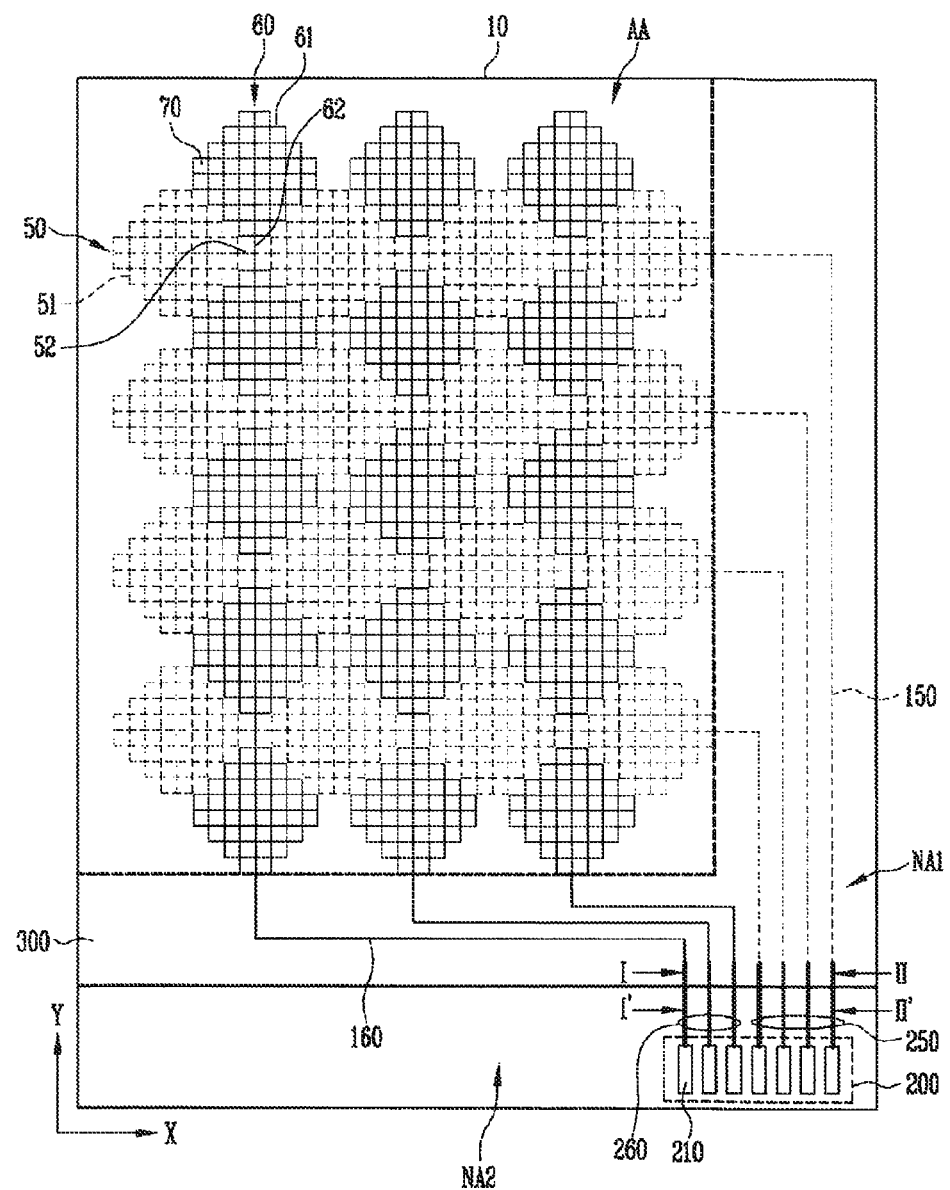
FIG. 1 is a plan view illustrating an example of a structure of a touch screen panel according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter, the embodiments of the present invention will be described in detail with reference to the accompanying drawings.

Figure 2A:
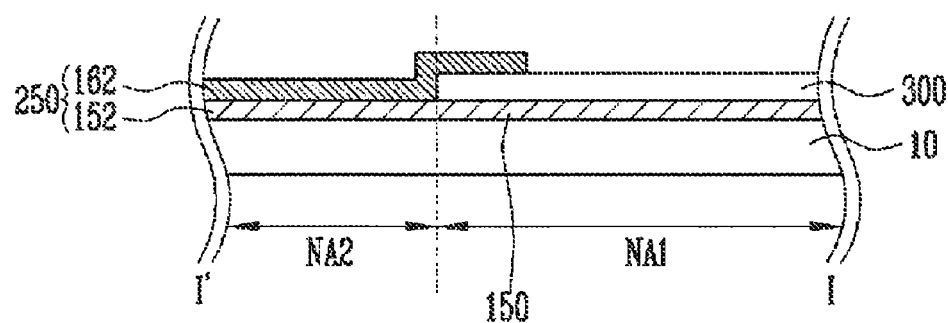
FIGS. 2A and 2B are sectional views taken along the line I-I' and the line II-II' of the touch screen panel illustrated in FIG. 1.
Figure 2B:
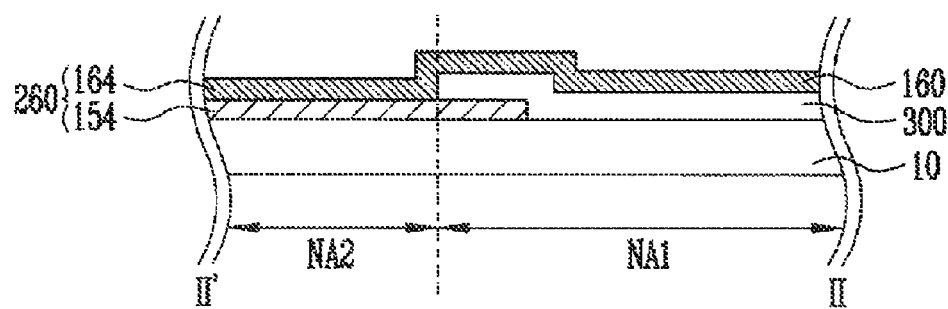

FIG. 1 is a plan view illustrating an example of a structure of a touch screen panel according to an embodiment of the present invention. FIGS. 2A and 2B are sectional views taken along the line I-I' and the line II-II' of the touch screen panel illustrated in FIG. 1.

First, referring to FIG. 1, the touch screen panel according to an embodiment of the present invention includes a flexible film substrate 10, first and second sensing electrodes 50 and 60 formed on at least one surface of the film substrate 10, and first and second position detecting lines 150 and 160 for electrically coupling the first and second sensing electrodes 50 and 60 to a plurality of pads 210 positioned in a pad unit 200. Additionally, the touch screen panel according to the present embodiment further includes first and second coupling units 250 and 260 for coupling the first and second position detecting lines 150 and 160 to the pads 210.

Here, in an active area AA where the plurality of sensing electrodes 50 and 60 are formed, a touch position may be detected, and a non-active area NA in which the position detecting lines 150 and 160, the coupling units 250 and 260, and the pad unit 200 are formed is provided on the outside of the active area AA.

In addition, in the present embodiment, the non-active area NA is divided into a first non-active area NA1 in which the position detecting lines 150 and 160 are formed and a second non-active area NA2 positioned on the outside of the first non-active area NA1, in which the coupling units 250 and 260 for coupling the position detecting lines 150 and 160 to the pads 210 provided in the pad unit 200 are formed.

The first sensing electrodes 50 may be longitudinally formed to be coupled in units of row lines in a first direction, for example, an X axis direction, and may be arranged in a second direction, for example, a Y axis direction, that intersects the first direction.

In addition, the second sensing electrodes 60 may be longitudinally formed to be coupled in units of columns in the second direction and may be arranged in the first direction.

A ductile opaque conductive material may be patterned to a mesh network to form the sensing electrodes 50 and 60. The sensing electrodes 50 and 60 may be formed of a low resistance opaque metal conductive layer, for example, one of Ag, Al, Cu, Cr, and Ni and a nano metal conductive layer such as Ag NW. However, the present invention is not limited to the above. At this time, since the sensing electrodes 50 and 60 are mesh-shaped, a plurality of apertures 70 exist in each of the sensing electrodes 50 and 60. Therefore, although the sensing electrodes 50 and 60 are formed of opaque metal, it is possible to prevent the sensing electrodes 50 and 60 from being visible.

As described above, when the ductile conductive material is patterned to form a mesh network comprising the sensing electrodes 50 and 60, the sensing electrodes 50 and 60 may have the necessary flexibility for use in the flexible touch screen panel.

The above structure of the sensing electrodes 50 and 60 is only an example of a structure suitable for the present invention, which is to be further described lateras a structure of a film substrate that may be bent or folded, showing improved flexibility. However, the present invention is not limited to the above. For example, the sensing electrodes may be formed of a transparent conductive material such as indium tin oxide (ITO), and both the size of the sensing electrodes and the distance between the sensing electrodes may be controlled in the region of the film substrate where the sensing electrodes may be bent or folded in order to make possible a flexible touch screen. On the other hand, when the sensing electrodes 50 and 60 are formed of the opaque metal, metal reflection glossiness and surface reflectance may increase so that a user may recognize the sensing electrodes 50 and 60 and, as a result, may not perceive the associated touch screen as a high quality product. In this case, a flexible polarizing film (not shown) may be attached onto the film substrate 10 on which the sensing electrodes 50 and 60 are formed so that it is possible to prevent the sensing electrodes 50 and 60 from being visible.

The structure of the sensing electrodes 50 and 60 is described in detail below. The first sensing electrodes 50 may consist of a plurality of first sensing cells 51 arranged in a first direction and first coupling patterns 52 for electrically coupling the first sensing cells 51 to each other. The second sensing electrodes 60 may consist of a plurality of second sensing cells 61 arranged in a second direction and second coupling patterns 62 for electrically coupling the second sensing cells 61 to each other.

In addition, the plurality of apertures 70 may be formed in each of the first sensing cells 51, the second sensing cells 61, and the first coupling patterns 52, and the second coupling patterns 62 so that the mesh type sensing electrodes 50 and 60 may be realized.

At this time, the first sensing cells 51 and the second sensing cells 61 may be diamond-shaped. However, the shape of the sensing cells according to the embodiment of the present invention is not limited to the above.

In particular, a display panel in which a plurality of pixels are regularly arranged to display an image may be provided under the film substrate 10 in which the sensing cells 51 and 61 are formed. In this case, when the shape and arrangement of the sensing cells 51 and 61 have regularity, since the Moire phenomenon is generated by interference between the sensing cells and the pixels in the display panel so that display quality may deteriorate, the frames of the sensing cells 51 and 61 may be randomly curved to solve the problem. In the present embodiment, for convenience sake, as illustrated in FIG. 1, the sensing cells 51 and 61 are diamond-shaped.

Each of the first position detecting lines 150 may be coupled to one end of each of the first sensing electrodes 50, and each of the second position detecting lines 160 may be coupled to one end of each of the second sensing electrodes 60. The first position detecting lines 150 and the second position detecting lines 160 may transmit a signal detected by the sensing electrodes 50 and 60 to an external touch driving circuit (not shown) via the first and second coupling units 250 and 260 and the pads 210 provided in the pad unit 200. In this way, the touch driving circuit may properly interpret the touch position of the user.

The first position detecting lines 150 may be formed of the same material as the first sensing electrodes 50 coupled thereto, and the second position detecting lines 160 may be formed of the same material as the second sensing electrodes 60 coupled thereto. By virtue of the fact that the position detecting lines 150 and 160 may be formed through the same processes as and with the same materials as the sensing electrodes 50 and 60, processes may be simplified.

In addition, the present invention is not limited to the above, but the coupling units 250 and 260 may be designed to have a multi-layer wiring line structure in the present embodiment.

For example, the first sensing electrodes 50 and the first position detecting lines 150 coupled thereto may be formed on one surface of the film substrate 10, and the second sensing electrodes 60 and the second position detecting lines 160 coupled thereto may be formed on an insulating layer 300. In this case, in an embodiment of the present invention, the insulating layer 300 is formed of two layers that are entirely formed between the first sensing electrodes 50 and the second sensing electrodes 60. The present invention is not limited to the above; the first sensing electrodes 50 and the second sensing electrodes 60 may be arranged in the same layer. In the latter case, the insulating layer may be locally formed only at the intersections of the first sensing electrodes 50 and the second sensing electrodes 60.

On the other hand, when the sensing electrodes 50 and 60 have a two-layer structure, the insulating layer 300 may be formed on only an area that overlaps the active area AA and the first non-active area NA1, and the insulating layer 300 may not be formed in the second non-active area NA2 where the pad unit 200 and the coupling units 250 and 260 are formed. This arrangement allows pad unit 200 to easily contact a flexible printed circuit board (FPCB) (not shown) in which the touch driving circuit is mounted.

In this case, since the first coupling units 250 coupled between the first position detecting lines 150 and the pads 210 may be positioned in the second non-active area NA2, where they are not protected by the insulating layer 300 and left exposed, the first coupling units 250 may be shorted by over etching during a process of patterning the second sensing electrodes 60 and the second position detecting lines 160 positioned on the insulating layer 300.

In addition, since the second position detecting lines 160 may be formed on the insulating layer 300, and the second coupling units 260 may be positioned in the second non-active area NA2 outside the insulating layer 300, coupling between the second position detecting lines 160 and the second coupling units 260 may be broken by the step difference caused by the thickness of the insulating layer 300.

In order to solve this problem, in the present embodiment, the first and second coupling units 250 and 260 for coupling the first and second position detecting lines 150 and 160 and the pads 210 have a multi-layer wiring line structure.

More concretely, as illustrated in FIG. 2A, the first coupling units 250 may be formed of first lower wiring lines 152 formed on the film substrate 10 and first upper wiring lines 162 that overlap the first lower wiring lines 512, one end of each of them being extended onto the insulating layer 300.

At this time, the first lower wiring lines 152 are integrated with the first position detecting lines 150 and may be formed by extending the first position detecting lines 150 formed on the film substrate 10 of the first non-active area NA1 to the second non-active area NA2. That is, the first lower wiring lines 152 are the first position detecting lines 150 extended to the second non-active area NA2, in which the insulating layer 300 is not formed.

On the other hand, as described above, when the first coupling units 250 are formed of only the first lower wiring lines 152, since the first coupling units 250 may be shorted by over etching during a process of patterning the second sensing electrodes 60 and the second position detecting lines 160 may be positioned on the insulating layer 300, in the present embodiment, the first upper wiring lines 162 are formed on the first lower wiring lines 152 to overlap the first lower wiring lines 152.

At this time, the first upper wiring lines 162 are simultaneously formed with the second sensing electrodes 60 and the second position detecting lines 160. Since the first upper wiring lines 162 are formed to prevent the first lower wiring lines 152 formed by extending the first position detecting lines 150 to the second non-active area NA2 from being over etched, the first upper wiring lines 162 are floated, that is, are not electrically coupled to the second position detecting lines 160.

Therefore, as illustrated in FIG. 2A, the first upper wiring line 162 overlaps the corresponding first lower wiring line 152 and has one end thereof extended onto the insulating layer 300 to be broken.

Then, FIG. 2B is a view illustrating the section of the second coupling unit 260 for an embodiment of the invention. As illustrated in FIG. 2B, the second coupling unit 260 is formed of a second lower wiring line 154 that is formed on the thin film 10 with one end partially extended under the insulating layer 300; and a second upper wiring line 164 that overlaps the second lower wiring line 154 and that is coupled to a second position detecting line 160, which is formed on the insulating layer 300.

Then, as illustrated in FIG. 2B, the second upper wiring line 164 is integrated with the second position detecting line 160 and is formed by extending the second position detecting line 160 formed on the insulating layer 300 of the first non-active area NA1 to the second non-active area NA2. That is, the second upper wiring line 164 is the second position detecting line 160 extended to the second non-active area NA2 in which the insulating layer 300 is not formed.

As described above, when the second coupling unit 260 is formed of only the second upper wiring line 164, since coupling between the second position detecting line 160 and the second coupling unit 260 may be broken by step difference caused by the thickness of the insulating layer 300, in the present embodiment, the second lower wiring line 154 is formed under the second upper wiring line 164 to overlap the second upper wiring line 164.

Then, further according to an embodiment of the invention, the second lower wiring lines 154 are simultaneously formed with the first sensing electrodes 50 and the first position detecting lines 150. Since the second lower wiring lines 154 are formed to compensate for the step difference of the second upper wiring lines 164 formed by extending the second position detecting lines 160 to the second non-active area NA2, the second lower wiring lines 154 are floated, that is, are not electrically coupled to the first position detecting lines 150.

Therefore, as illustrated in FIG. 2B, the second lower wiring line 154 overlaps the corresponding second upper wiring line 164 and has one end thereof extended under the insulating layer 300 to be broken.

According to the above-described structure of the touch screen panel according to the present embodiment, since the sensing electrodes 50 and 60 are patterned to meshes having the plurality of apertures 70, limitation on the material of the sensing electrodes 50 and 60 is reduced so that the sensing electrodes 50 and 60 may be formed of ductile opaque metal and that coupling between the position detecting lines 150 and 160, and the pad unit 200 is stabilized. Therefore, it is possible to realize a flexible touch screen panel that may be deformed by external force.

In order to realize the flexible touch screen panel, the film substrate 10 must have flexibility. In this connection, a method of manufacturing the flexible touch screen panel using a material that can form a thin film, such as one of poly(ethylene terephthalate) (PET) and polyimide (PI), may be suggested. However, although the flexible touch screen panel may be formed of the thin film, the film must meet a predetermined hardness standard in order to be entirely secured to the rest of the device. With thin film polymers with sufficient hardness, the ultimate deformation ratio is too small to allow enough flexibility for bending and folding of the touch screen panel. In particular, since the entire area of the thin film has the same elongation ratio, it may be difficult to optimize hardness and an elongation ratio by region so that a specific region may be bent or folded. Therefore, the use of the touch screen panel is limited.

Therefore, according to the present invention, the flexible touch screen panel in which elongation ratios differ between regions of the film substrate is disclosed to be suitable for various requirements of consumers so that the use of the touch screen panel may be increased. Flexible touch screen panels in accordance with embodiments of the invention will be described hereinafter with reference to FIGS. 3 to 8.

Figure 4:
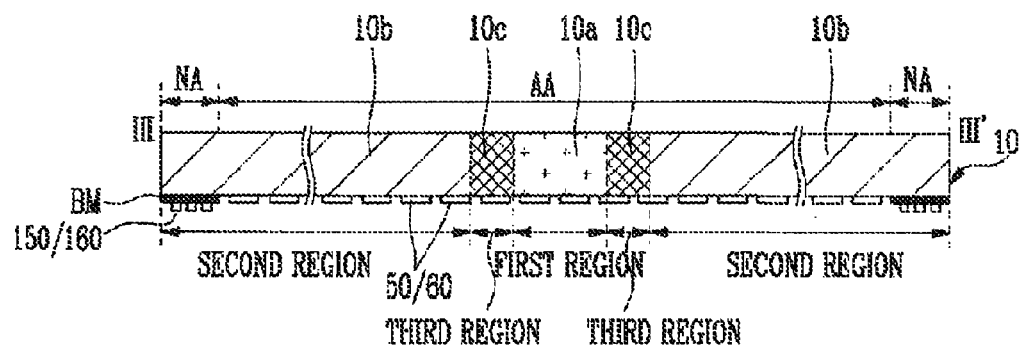
FIG. 4 is a sectional view taken along the line III-III' of the touch screen panel illustrated in FIG. 3.
Figure 5:
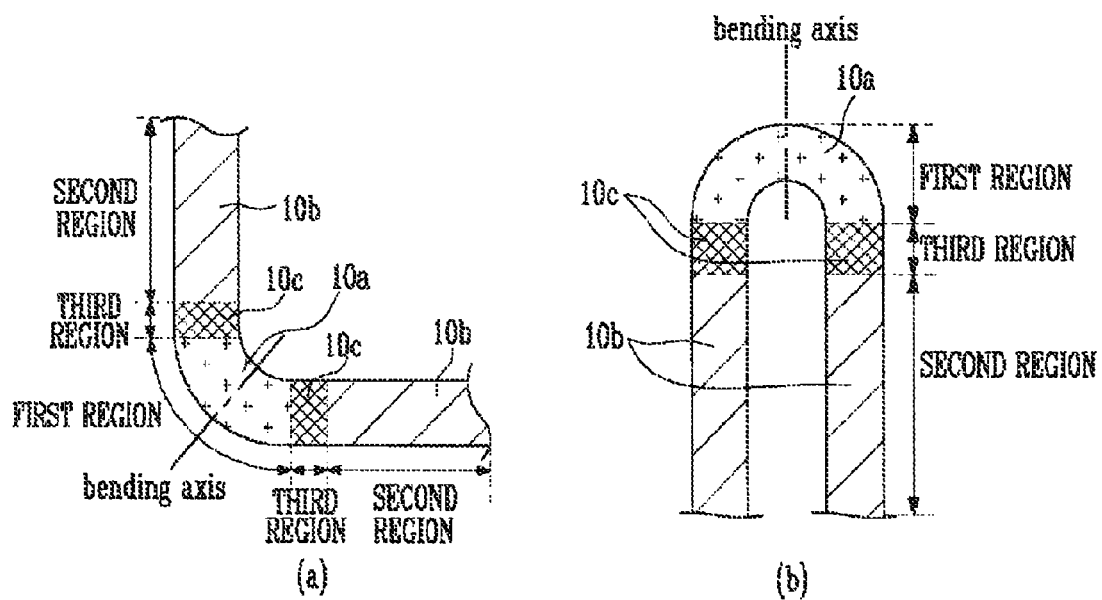
FIG. 5 is a sectional view schematically illustrating the section of the film substrate illustrated in FIGS. 3 and 4 when the film substrate is bent or folded.

FIG. 3 is a plan view illustrating a touch screen panel according to an embodiment of the present invention. FIG. 4 is a sectional view taken along the line III-III' of the touch screen panel illustrated in FIG. 3. FIG. 5 is a sectional view schematically illustrating the section of the film substrate illustrated in FIGS. 3 and 4 when the film substrate is bent or folded.

According to an embodiment of the present invention, the sensing electrodes may be formed by patterning a ductile opaque metal to the mesh network as illustrated in FIGS. 1 and 2, may be formed of a transparent electrode material, and may be formed so that at least one of the size of the sensing electrodes and the distance between the sensing electrodes is controlled in each region of the film substrate. Therefore, in FIGS. 3 to 5, the film substrate that is the characteristic structure of the present invention will be illustrated and described in detail. The sensing electrodes are schematically illustrated, and detailed description thereof will be omitted.

Referring to FIGS. 3 to 5, the touch screen panel according to an embodiment of the present invention includes a film substrate 10, sensing electrodes 50 and 60 formed in at least one surface of the film substrate 10, for example, in the active area AA of the rear surface, and the position detecting lines 150 and 160 formed in the non-active area NA of at least one surface of the film substrate 10. In addition, in a window integrated touch screen panel, a decoration layer such as a black matrix BM may be further included in the non-active area NA.

The film substrate 10 of the touch screen panel according to embodiments of the present invention is divided into a plurality of regions, and the regions have different hardness components and elongation ratios.

For example, the film substrate 10 may include a first region 10a provided in a predetermined central region and having an elongation ratio that allows bending of the first region 10a and second regions 10b provided on at least one side of the first region 10a, the second regions having a smaller elongation ratio than that of the first region 10a and being formed to be harder than the first region 10a, and third regions 10c provided between the first region 10a and the second regions 10b, the third regions having an elongation ratio between that of the first region 10a and that of the second regions 10b. The film substrate 10 according to the present invention does not necessarily include the third regions 10c, but the third regions 10c may be added or removed as occasion demands.

The first region 10a may be a bending part that is easily deformed by external force. For example, when a bending axis is positioned in the first region 10a, the first region 10a may be formed to be bent as illustrated in FIG. 5A or folded as illustrated in FIG. 5B around the bending axis.

For this purpose, the first region 10a may be preferably formed of a soft material having a large elongation ratio. For example, the first region 10a may be formed of at least one of polydimethylsiloxane (hereinafter referred to as PDMS) and polyurethane. Such materials are soft. Therefore, when the first region 10a is formed of at least one of PDMS and polyurethane, since the first region 10a may have an elongation ratio of about 160% to about 180%, it is possible to realize a flexible touch screen panel that may be usefully applied to a rollable or foldable flexible image display device.

Although the bendable or foldable flexible touch screen panel is required, a predetermined hardness may be simultaneously required in order for the flexible panel to be secured properly to the rest of the device. For example, a predetermined region may be formed to be foldable, and the remaining region may be formed to be harder so that hardness requirements may vary in each region of the touch screen panel to be integrated into a touch screen window. According to embodiments of the present invention, the film substrate 10 in which hardness components and elongation ratios differ between regions of the film substrate is disclosed. The second regions 10b provided on at least one side of the first region 10a may be formed to have a smaller elongation ratio than that of the first region 10a and to be harder than the first region 10a so that the overall hardness condition of the touch screen panel that is required in order to keep the panel in place may be satisfied.

For this purpose, the second regions 10b may be formed of a predetermined film material capable of securing a predetermined hardness, for example, hardness of about 2H to 6H, and of providing an elongation ratio of about 2% to about 4%. For example, the second regions 10b may be formed of at least one selected from poly(methyl methacrylate) (PMMA), polyimide, and polyethersulfone.

The second regions 10b may be provided on at least one side of the first region 10a and may be provided in parts where a predetermined hardness is required to be attained. For example, the second regions 10b may be provided above and/or below the first region 10a or on the left and/or right of the first region 10a.

The present invention is not limited to the above. The film substrate 10 may further include the third regions 10c provided between the first region 10a and the second regions 10b.

The third regions 10c may be preferably formed to have an elongation ratio between that of the first region 10a and that of the second regions 10b, and the third regions serve the purpose of maintaining continuity between the first region 10a and the second regions 10b.

For example, the third regions 10c may be formed of a polymer film material, the hardness of the polymer film material being gradually increased from a low extreme on the side adjacent to the first region 10a to a high extreme on other sides that are adjacent to the second regions 10b.

For example, the third regions 10c may be formed of PDMS, the content of a hardener in the precursor monomer mixture being gradually increased from a low extreme on one side adjacent to the first region 10a to a high extreme on other sides that are adjacent to the second regions 10b (for example, from about 0.1% to about 5%). Therefore, hardness may be gradually increased from the side of the first region 10a to the sides of the second regions 10b via the third regions 10c, and formation of the third regions may improve continuity between the first region 10a and the second regions 10b.

When the third regions 10c are UV hardened, the content of photoinitiator is gradually varied from a low extreme on the side adjacent to the first region to a high extreme on other sides that are adjacent to the second regions (for example, from about 0.1% to about 5%) so that a hardness gradient may be established in the third regions 10c and so that the elongation ratio, which is related to hardness, may be controlled.

As described above, the flexible touch screen panel includes the film substrate 10, which is divided into a plurality of regions having different elongation ratios. The hardness and elongation ratio may be optimized by region to cope with various requirements of consumers. In particular, the bendable or foldable flexible touch screen panel may be realized.

Figure 6:
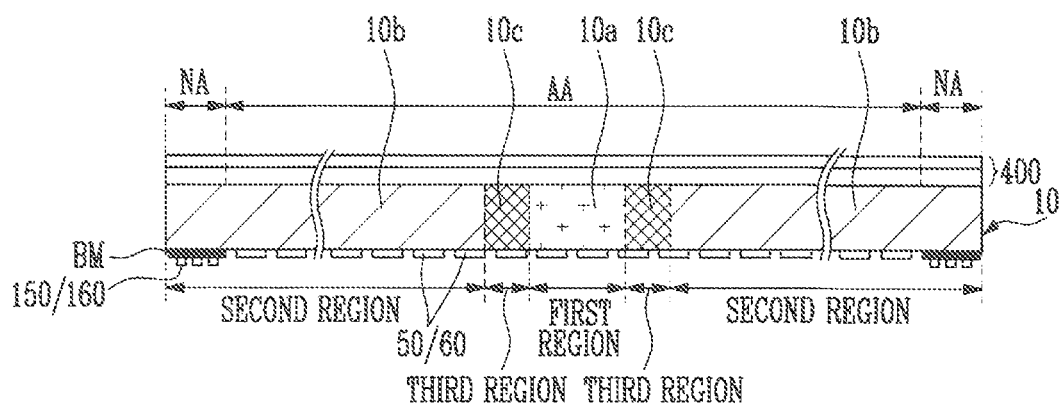
FIG. 6 is a sectional view illustrating a touch screen panel according to another embodiment of the present invention.

FIG. 6 is a sectional view illustrating a touch screen panel according to another embodiment of the present invention. For convenience sake, in FIG. 6, like reference numerals refer to like elements, and detailed description of the elements is omitted.

Referring to FIG. 6, the touch screen panel may further include a functional coating layer 400 such as a hard coating layer or a fingerprint preventing coating layer. The functional coating layer 400 that may be usefully applied to the window integrated touch screen panel may be entirely provided on the external surface where a touch input is generated, for example, a surface that is opposite to the at least one surface of the film substrate on which the sensing electrodes 50 and 60 are formed.

Figure 7:
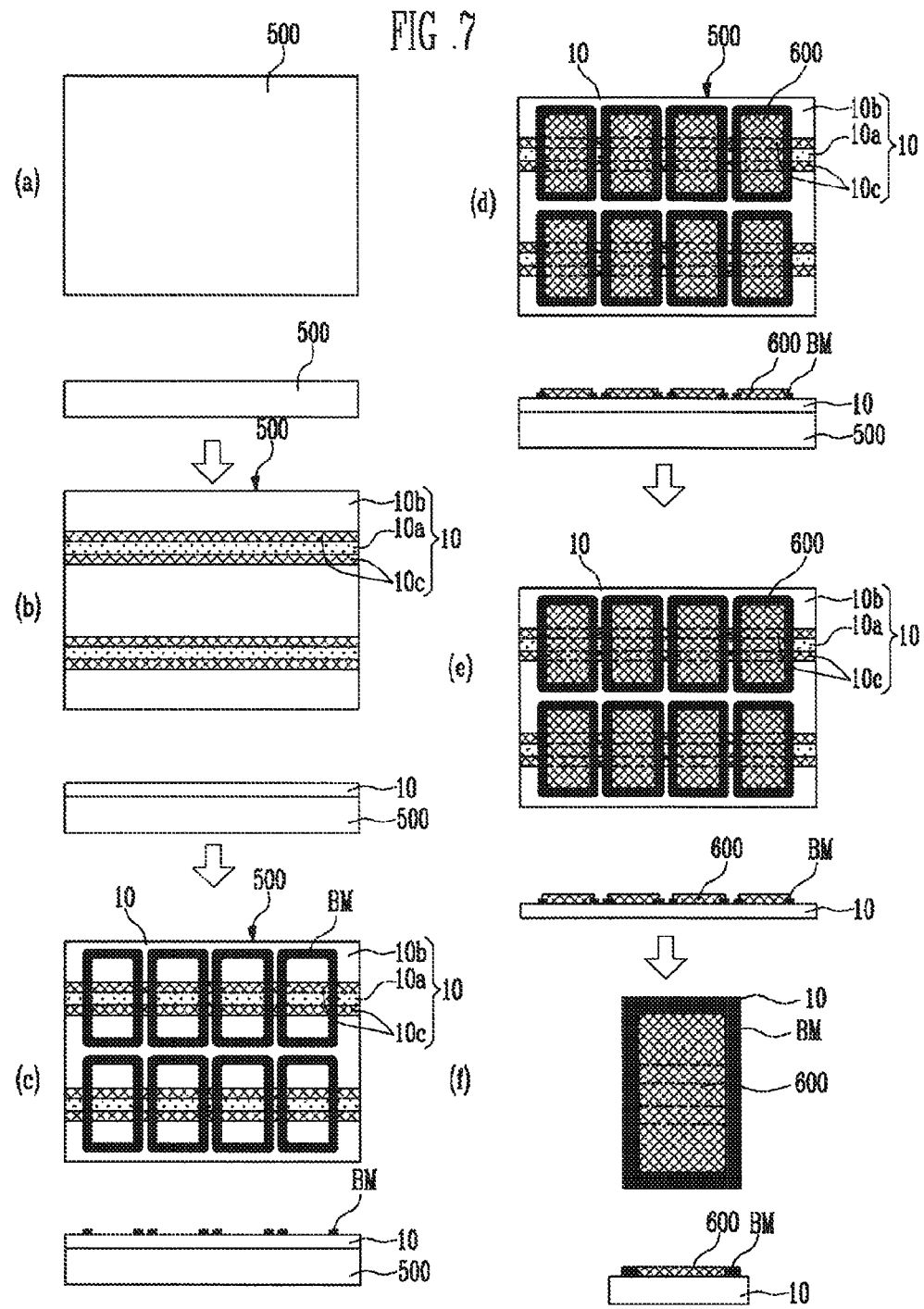
FIG. 7 is a plan view sequentially illustrating a method of manufacturing a touch screen panel according to an embodiment of the present invention and a sectional view corresponding to the plan view.
Figure 8:
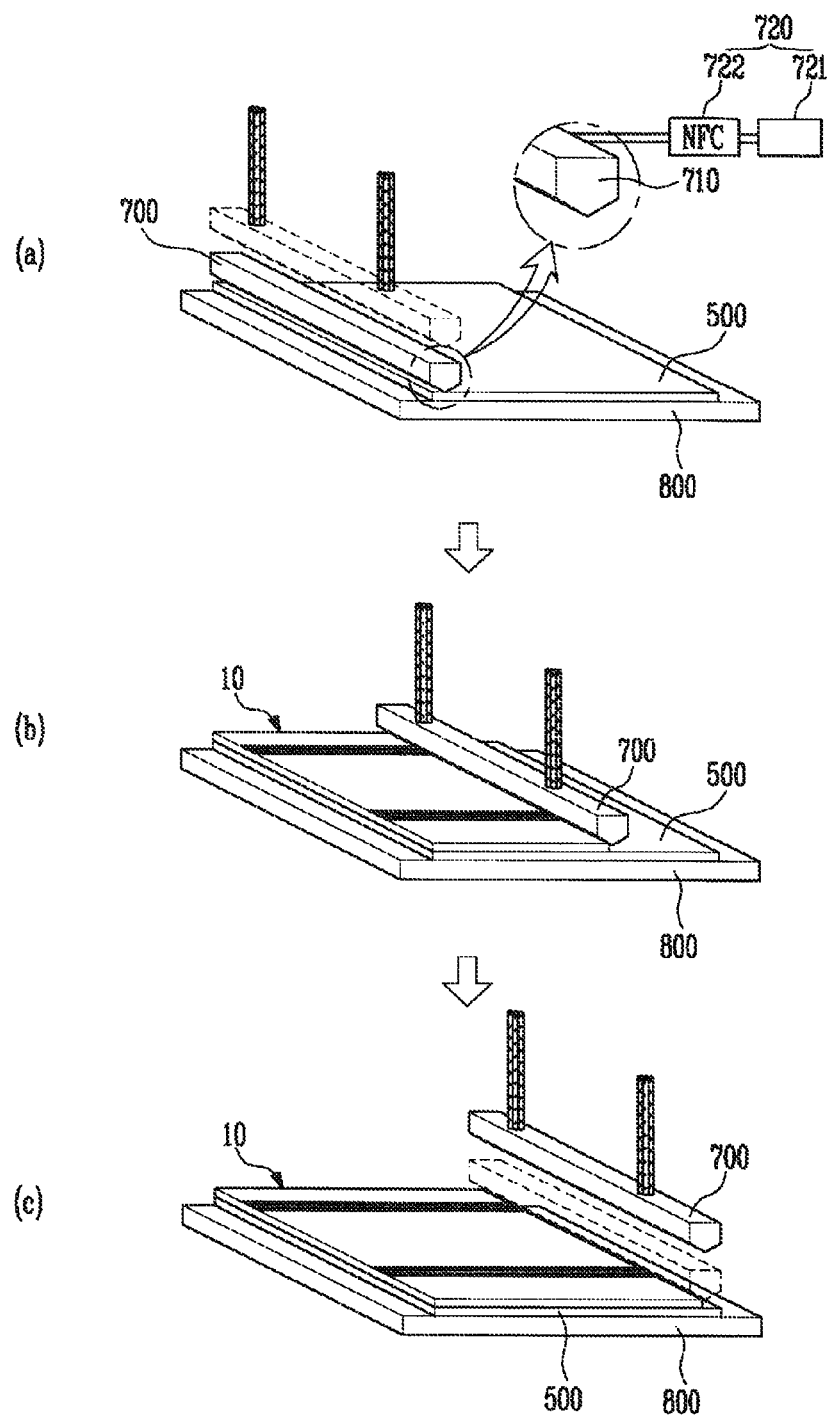
FIG. 8 is a perspective view illustrating a method of forming a film substrate during the step of manufacturing the touch screen panel illustrated in FIG. 7.

FIG. 7 is a plan view sequentially illustrating a method of manufacturing a touch screen panel according to an embodiment of the present invention and a sectional view corresponding to the plan view. FIG. 8 is a perspective view illustrating a method of forming a film substrate during the step of manufacturing the touch screen panel illustrated in FIG. 7. On the other hand, in FIGS. 7 and 8, an example in which a plurality of touch screen panels are formed on one supporting substrate and are separated from each other is disclosed.

First, referring to FIG. 7, a method of manufacturing the touch screen panel according to an embodiment of the present invention includes providing a supporting substrate 500, a plurality of regions of the supporting substrate being distinguished from each other, coating a plurality of film materials onto the supporting substrate 500, the distinct regions of the supporting substrate 500 being coated with different film materials, hardening the film materials to form a film substrate 10, forming touch sensing patterns 600 including sensing electrodes on the film substrate 10, and separating the supporting substrate 500 and the film substrate 10 from each other. In forming the film substrate 10, the regions of the supporting substrate 500 are distinguished from each other, and the regions are coated with different film materials, respectively, so that the regions of the film substrate 10 are formed of different materials.

In an embodiment of the invention, referring to the above method of manufacturing a touch screen panel, the flexible touch screen may comprise a predetermined central region that is referred to as a first region and regions provided on at least one side of the first region that are referred to as second regions. The providing step may further comprise identifying distinct regions of the supporting substrate that correspond to the first region and the second regions of the flexible touch screen; the coating step may further comprise coating the first region and the second regions of the supporting substrate with different film materials; the hardening step may further comprise forming a film substrate having a first region corresponding to the first region of the supporting substrate and second regions corresponding to the second regions of the supporting substrate, the second regions of the film substrate having a hardness that is greater than that of the first region of the film substrate.

In another embodiment of the invention, the above method of manufacturing a flexible touch screen panel may be further described to include a flexible touch screen panel further comprising third regions between the first region and the second regions. The providing step may further comprise identifying third regions of the supporting substrate corresponding to the third regions of the flexible touch screen; the coating step may further comprise coating the third regions of the supporting substrate with a film material that is different from the film materials used to coat the first region of the supporting substrate and the second regions of the supporting substrate; and the hardening step may further comprise forming a film substrate having third regions corresponding to the third regions of the supporting substrate, the third regions of the film substrate being formed of a polymer film material that is harder than the film material forming the first region of the film substrate and softer than the film material forming the second regions of the film substrate.

Describing the above more concretely, as illustrated in FIG. 7A according to an embodiment of the invention, the supporting substrate 500 is prepared. Here, the supporting substrate 500 is a hard substrate such as glass.

Then, as illustrated in FIG. 7B, the film substrate 10 is formed on the supporting substrate 500 by coating and hardening a film material. In forming the film substrate 10 according to the present invention, a predetermined central region of the flexible touch screen panel is referred to as a first region 10a, regions provided on at least one side of the first region 10a, for example, above and below the first region 10a, are referred to as second regions 10b, and regions between the first region 10a and the second regions 10b are referred to as third regions 10c. The first region 10a, the second regions 10b, and the third regions 10c are coated with different film materials. The present invention is not limited to including the third regions 10c but the third regions 10c may be selectively added or removed.

Here, the multi slit coater illustrated in FIG. 8 may be used for coating different film materials onto the distinct regions of supporting substrate 500.

Again, a slit coater may be used for coating a film material on the supporting substrate 500. According to the present invention, a multi slit coater 700 having distinguished regions may be used so that the distinct regions of the supporting substrate 500 may be coated with different film materials. That is, a process of coating the film material on the supporting substrate 500 may be performed by settling the supporting substrate 500 on a substrate support 800 and by coating different film materials on the regions of the supporting substrate 500 using the multi slit coater 700.

For example, the first region 10a may be coated with at least one film material, the first region film material being selected from PDMS and polyurethane, the second regions 10b are coated with a film material harder than the film material coated on the first region 10a, for example, at least one film material selected from PMMA, polyimide and polyethersulfone, and the third regions 10c may be coated with a polymer film material that is harder than the film material coated on the first region 10a and softer than the film material coated on the second regions 10b.

In coating the polymer film material on the third regions 10c, the film material may be formed so that the film material coated on the third regions 10c has hardness that may be gradually increased from the side of the first region 10a to the sides of the second regions 10b. For example, the concentration of the hardener included in the film material coated on the third regions 10c may be gradually increased from the side of the first region 10a to the sides of the second regions 10b. The present invention is not limited to the above, but, for another example, the third regions 10c may be coated with the same coating solution, and the concentration of the photoinitiator may be gradually increased over the expanse from the first region to the second regions so that the degree of UV hardening may vary in a subsequent hardening process.

The multi slit coater 700 may include a slit nozzle 710 and a coating solution supply unit 720. The slit nozzle 710 receives a coating solution from the coating solution supply unit 720 and allows spraying of the coating solution onto the supporting substrate 500. The slit nozzle 710 may be designed so that the regions therein are distinguished from each other and that different coating solutions may be sprayed by region. The coating solution supply unit 720 includes a coating solution tank 721 and a mass flow controller (MFC) 722. The coating solution corresponding to the corresponding region may be supplied to the coating solution tank 721.

When the process of coating the different film materials on the regions of the supporting substrate 500 is completed by the multi slit coater 700 as illustrated in FIG. 7B, the film materials are hardened so that the film substrate 10 is formed.

Then, when the touch screen panel is window integrated, as illustrated in FIG. 7C, the decoration layer including the black matrix BM is formed on the outside of each of the touch screen panels.

Then, as illustrated in FIG. 7D, the touch sensing pattern 600 including the sensing electrodes and the position detecting lines is formed on each of the touch screen panels.

Then, after the film substrate 10 is separated from the supporting substrate 500 as illustrated in FIG. 7E by radiating laser light onto the supporting substrate 500, the touch screen panels are separated by a cutting process to produce the touch screen panel illustrated in FIG. 7F.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of manufacturing a flexible touch screen panel, comprising:
   providing a supporting substrate, a plurality of distinct regions of the supporting substrate being distinguished from each other;
   coating a plurality of film materials onto the supporting substrate, the distinct regions of the supporting substrate being coated with correspondingly distinct sets of one or more film materials, the coated film materials forming a continuous layer covering adjacent regions on the supporting substrate, the regions of at least a single layer of film materials being distinct from each other;
   hardening the film materials to form a film substrate;
   forming touch sensing patterns including sensing electrodes on the film substrate; and
   separating the supporting substrate and the film substrate from each other, the flexible touch screen panel comprising:
      a predetermined central region that is referred to as a first region and regions provided on at least one side of the first region that are referred to as second regions,
      the providing step further comprising identifying distinct regions of the supporting substrate that correspond to the first region and the second regions of the flexible touch screen,
      the coating step further comprising coating the first region and the second regions of the supporting substrate with different film materials,
      the hardening step further comprising forming a film substrate having a first region corresponding to the first region of the supporting substrate and second regions corresponding to the second regions of the supporting substrate, the second regions of the film substrate having a hardness that is greater than that of the first region of the film substrate, the flexible touch screen panel further comprising:
         third regions between the first region and the second regions,
         the providing step further comprising identifying third regions of the supporting substrate corresponding to the third regions of the flexible touch screen,
         the coating step further comprising coating the third regions of the supporting substrate with a film material that is different from the film materials used to coat the first region of the supporting substrate and the second regions of the supporting substrate,
         the hardening step further comprising forming a film substrate having third regions corresponding to the third regions of the supporting substrate, and
         the third regions of the film substrate being formed of a polymer film material that is harder than the film material forming the first region of the film substrate and softer than the film material forming the second regions of the film substrate.

2. The method as claimed in claim 1, the coating step further comprising coating the distinct regions of the supporting substrate with different film materials using a multi slit coater.

3. The method as claimed in claim 1, the first region being coated with at least one selected from polydimethylsiloxane (PDMS) and polyurethane, and
   the second regions being coated with at least one film material selected from poly(methyl methacrylate) (PMMA), polyimide, and polyethersulfone.

4. The method as claimed in claim 1, further comprised of:
   the film material used to coat the third regions of the supporting substrate comprising a polymer film material, and
   the third regions of the film substrate having a hardness gradient such that hardness of the film substrate gradually increases from a low extreme on the side of the first region of the film substrate to a high extreme on the sides of the second regions of the film substrate.

5. The method as claimed in claim 4, the coating step further comprised of:
   coating the third regions of the supporting substrate with a film material in which the concentration of one of a hardener and a photoinitiator gradually increases from a low extreme on the side of the first region of the supporting substrate to a high extreme on the sides of the second regions of the supporting substrate, and
   the hardening step being accomplished by means selected from thermal means and ultraviolet light exposure.

* * * * *